United States Patent
Kjær et al.

(10) Patent No.: US 11,384,733 B2
(45) Date of Patent: Jul. 12, 2022

(54) MODULATING WIND POWER PLANT OUTPUT USING DIFFERENT FREQUENCY MODULATION COMPONENTS FOR DAMPING GRID OSCILLATIONS

(71) Applicant: VESTAS WIND SYSTEMS A/S, Aarhus N (DK)

(72) Inventors: Philip Carne Kjær, Aarhus (DK); Florin Iov, Aalborg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 204 days.

(21) Appl. No.: 15/779,966

(22) PCT Filed: Dec. 7, 2016

(86) PCT No.: PCT/DK2016/050414
§ 371 (c)(1),
(2) Date: May 30, 2018

(87) PCT Pub. No.: WO2017/101941
PCT Pub. Date: Jun. 22, 2017

(65) Prior Publication Data
US 2018/0363629 A1  Dec. 20, 2018

(30) Foreign Application Priority Data

Dec. 17, 2015  (DK) .............................. PA201570831

(51) Int. Cl.
*F03D 9/25* (2016.01)
*F03D 7/02* (2006.01)
(Continued)

(52) U.S. Cl.
CPC ........... *F03D 9/255* (2017.02); *F03D 7/0284* (2013.01); *F03D 7/0296* (2013.01); *F03D 7/048* (2013.01);
(Continued)

(58) Field of Classification Search
CPC ...... F03D 9/255; F03D 7/0284; F03D 7/0296; F03D 7/048; H02J 3/24; F05B 2270/1041;
(Continued)

(56) References Cited

U.S. PATENT DOCUMENTS 6,891,280 B2 * 5/2005 Siegfriedsen ......... F03D 7/0296
290/51
6,927,639 B2 * 8/2005 Chen ..................... H03L 7/0812
327/119

(Continued)

FOREIGN PATENT DOCUMENTS

DE 202008006322 U1 * 7/2008 ............... F03D 7/02
EP 1665494 A1 6/2006
(Continued)

OTHER PUBLICATIONS

Cai et al, (Adaptive Wide-Area Damping Control Scheme for Smart Grids with Consideration of Signal Time Delay), 2013, pp. 4841-4858 downloaded from the internet https://www.researchgate.net/publication/276036247_Adaptive_Wide-Area_Damping_Control_Scheme_for_Smart_Grids_with_Consideration_of_Signal (Year: 2013).*

(Continued)

*Primary Examiner* — Rocio Del Mar Perez-Velez
*Assistant Examiner* — Olvin Lopez Alvarez
(74) *Attorney, Agent, or Firm* — Patterson + Sheridan, LLP (57) ABSTRACT

A method, controller, wind power plant, and computer program product are disclosed for operating a wind power plant comprising a plurality of wind turbines, the wind power plant producing a plant power output. The method comprises receiving a modulation request signal indicating a requested modulation of the plant power output, the (Continued)

requested modulation specifying a modulation frequency. The method further comprises generating a respective power reference signal for each of at least two wind turbines of the plurality of wind turbines selected to fulfill the requested modulation, Each generated power reference signal includes a respective modulation component corresponding to a portion of the requested modulation and having a frequency different than the modulation frequency.

17 Claims, 5 Drawing Sheets

(51) Int. Cl.
*H02J 3/24* (2006.01)
*F03D 7/04* (2006.01)

(52) U.S. Cl.
CPC .......... *H02J 3/24* (2013.01); *F05B 2270/1041* (2013.01); *F05B 2270/337* (2013.01); *F05B 2270/404* (2013.01); *Y02E 10/72* (2013.01)

(58) Field of Classification Search
CPC .......... F05B 2270/337; F05B 2270/404; Y02E 10/72; Y02E 10/725
See application file for complete search history.

(56) References Cited

U.S. PATENT DOCUMENTS

| | | | | |
|---|---|---|---|---|
| 8,610,299 | B2* | 12/2013 | Yasugi | F03D 7/047 290/44 |
| 8,892,268 | B2* | 11/2014 | Huomo | H02J 3/06 700/296 |
| 2002/0039299 | A1 | 4/2002 | Nishimura et al. | |
| 2006/0280275 | A1* | 12/2006 | Chou | H03K 5/00006 375/375 |
| 2009/0142178 | A1* | 6/2009 | Nieuwenhuizen | E04H 12/085 415/2.1 |
| 2009/0302900 | A1* | 12/2009 | Marutani | H03K 23/667 327/117 |
| 2010/0299550 | A1* | 11/2010 | Bengtson | H04J 3/0638 713/375 |
| 2011/0301769 | A1* | 12/2011 | Lovmand | F03D 7/028 700/287 |
| 2012/0004781 | A1* | 1/2012 | Santos | F03D 7/0284 700/287 |
| 2012/0104755 | A1* | 5/2012 | Hashimoto | F03D 7/0284 290/44 |
| 2012/0161444 | A1 | 6/2012 | Tarnowski | |
| 2014/0361537 | A1 | 12/2014 | Andresen et al. | |
| 2015/0102679 | A1* | 4/2015 | Nielsen | F03D 7/048 307/84 |
| 2015/0275862 | A1* | 10/2015 | Babazadeh | H02J 3/50 290/44 |
| 2017/0012584 | A1* | 1/2017 | Lee | H03K 21/02 |
| 2018/0073486 | A1* | 3/2018 | Zhang | F03D 9/257 |
| 2018/0159546 | A1* | 6/2018 | Ek | H03L 7/191 |

FOREIGN PATENT DOCUMENTS

| | | | |
|---|---|---|---|
| EP | 2869419 A1 | 5/2015 | |
| EP | 3007298 * | 4/2016 | ............... H02J 3/24 |
| WO | 2008061698 A2 | 5/2008 | |
| WO | WO 2009082326 * | 7/2009 | ............... F03D 7/02 |
| WO | 2012041527 A1 | 4/2012 | |
| WO | 2014121794 A1 | 8/2014 | |
| WO | 2015085465 A1 | 6/2015 | |
| WO | 2017101941 A1 | 6/2017 | |
| WO | WO20201735529 * | 9/2020 | ............... H02J 3/24 |

OTHER PUBLICATIONS

Singh et al (Oscillation Damping: A Comparison of Wind and Photovoltaic Power Plant Capabilities), Jul. 2014, pp. 1-8, downloaded from the internet https://www.nrel.gov/docs/fy14osti/62260.pdf (Year: 2014).*

Lyons "Sum of Two Equal-Frequency Sinusoids", 2014, pp. 7 downloaded from https://www.dsprelated.com/showarticle/635.php (Year: 2014).*

University of Rochester, (Spectral Analysis-fourier decomposition adding together different sine waves), Dec. 24, 2015, pp. 91, dowloaded from http://astro.pas.rochester.edu/~aquillen/phy103/Lectures/D_Fourier.pdf (Year: 2015).*

Swarthmore college, "The Fourier Series", Aug. 2014, pp. 5, downloaded from https://lpsa.swarthmore.edu/Fourier/Series/WhyFS.html (Year: 2014).*

Fessler, "Part 2: sinusoidal Signals", pp. 15, Jun. 9, 2003, downloaded from teh internet file:///C:/Users/olopez/Downloads/pdffox.com_part-2-sinusoidal-signals-outline-introduction-to-.pdf (Year: 2003).*

PCT International Search Report for Application No. PCT/DK2016/050414 dated Dec. 7, 2016.

Danish Patent and Trademark Office Technical Examination for Application No. PA 2015 70831 dated Jul. 13, 2016.

PCT Written Opinion of the International Searching Authority for Application No. PCT/DK2016/050414 dated Jul. 12, 2016.

* cited by examiner

MODULATING WIND POWER PLANT OUTPUT USING DIFFERENT FREQUENCY MODULATION COMPONENTS FOR DAMPING GRID OSCILLATIONS

BACKGROUND

Field of the Invention

Embodiments presented in this disclosure generally relate to techniques for operating wind turbines of a wind power plant to provide a modulated electrical power output to a connected electrical grid while avoiding exciting mechanical oscillations within components of the wind turbines.

Description of the Related Art

Modern power generation and distribution networks increasingly rely on renewable energy sources, such as wind turbines. In some cases, the wind turbines may be substitutes for conventional, fossil fuel-based generators. Beyond merely generating and delivering electrical power to the electrical grid, the wind turbines can be responsible for contributing to grid stability through, e.g., frequency regulation and/or voltage regulation. However, operational conditions of the wind turbine generators as well as natural variations in wind conditions can affect the ability of wind turbines to predictably deliver power. Additionally, wind conditions may at times be unsuitable for generating power.

Electrical grids typically span a significant geographic area and can be connected with a large number of electrical generators. Individual synchronous machines or groups of synchronous machines during operation can cause low frequency, inter-area power oscillations to develop between different regions of the electrical grid. To mitigate the effects of these low frequency power oscillations, wind power plants and other generation facilities connected with the electrical grid may be required or requested to provide power system stabilization (PSS) or damping functions for the electrical grid by modulating their power outputs to inject low-frequency oscillatory power in counter-phase to the power oscillations. For wind power plants, the requested modulation frequency may correspond to frequencies at which the wind turbines (or components thereof) are more susceptible to undesirable mechanical oscillations.

SUMMARY

One embodiment of the present disclosure is a method of operating a wind power plant comprising a plurality of wind turbines, the wind power plant producing a plant power output. The method comprises receiving a modulation request signal indicating a requested modulation of the plant power output, the requested modulation specifying a modulation frequency. The method further comprises generating a respective power reference signal for each of at least two wind turbines of the plurality of wind turbines selected to fulfill the requested modulation, Each generated power reference signal includes a respective modulation component corresponding to a portion of the requested modulation and having a frequency different than the modulation frequency.

The method advantageously allows the wind power plant to provide services such as damping or power system stabilization at frequencies that are suitable for the connected electrical network while avoiding operating the wind turbines of the wind power plant at frequencies that make the wind turbines particularly susceptible to mechanical oscillations. In turn, this tends to prevent accelerated wear of the wind turbine components.

In another embodiment, the frequency of each modulation component is a same frequency, and the power reference signals are generated to have different phase values. This embodiment advantageously provides a relatively simple implementation in which the modulation component of the power output of each wind turbine can be arithmetically summed to match the waveform of the requested modulation.

Another embodiment of the present disclosure is a controller for a wind power plant comprising a plurality of wind turbines and producing a plant power output. The controller comprises a determination module configured to receive a modulation request signal indicating a requested modulation of the plant power output, the requested modulation specifying a modulation frequency, and to select at least two wind turbines of the plurality of wind turbines to fulfill the requested modulation. The controller further comprises a power production module coupled with the determination module and configured to generate a respective power reference signal for each of the selected at least two wind turbines. Each generated power reference signal includes a respective modulation component corresponding to a portion of the requested modulation and having a frequency different than the modulation frequency. Another embodiment of the present disclosure is a wind power plant comprising a plurality of wind turbines and the controller described in a previous embodiment.

Another embodiment of the present disclosure is a computer program product comprising a computer-readable device having computer-readable program code embodied therewith, the computer-readable program code configured to perform an operation for controlling a wind power plant comprising a plurality of wind turbines and producing a plant power output. The operation comprises receiving a modulation request signal indicating a requested modulation of the plant power output, the requested modulation specifying a modulation frequency. The operation further comprises generating a respective power reference signal for each of at least two wind turbines of the plurality of wind turbines selected to fulfill the requested modulation. Each generated power reference signal includes a respective modulation component corresponding to a portion of the requested modulation and having a frequency different than the modulation frequency.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Embodiments are generally directed to techniques for operating a wind power plant comprising a plurality of wind turbines and producing a plant power output. The method generally comprises receiving a modulation request signal indicating a requested modulation of the plant power output. The requested modulation specifies a modulation frequency. The method further comprises generating a respective power reference signal for each of at least two wind turbines of the plurality of wind turbines selected to fulfill the requested modulation, wherein each generated power reference signal includes a respective modulation component corresponding to a portion of the requested modulation and having a frequency different than the modulation frequency. The frequencies of the different modulation components are selected such that a combination of the produced modulation power by each of the WTGs produces the requested modulation in the plant power output while avoiding operating the WTGs at the susceptible frequencies.

Figure 1:
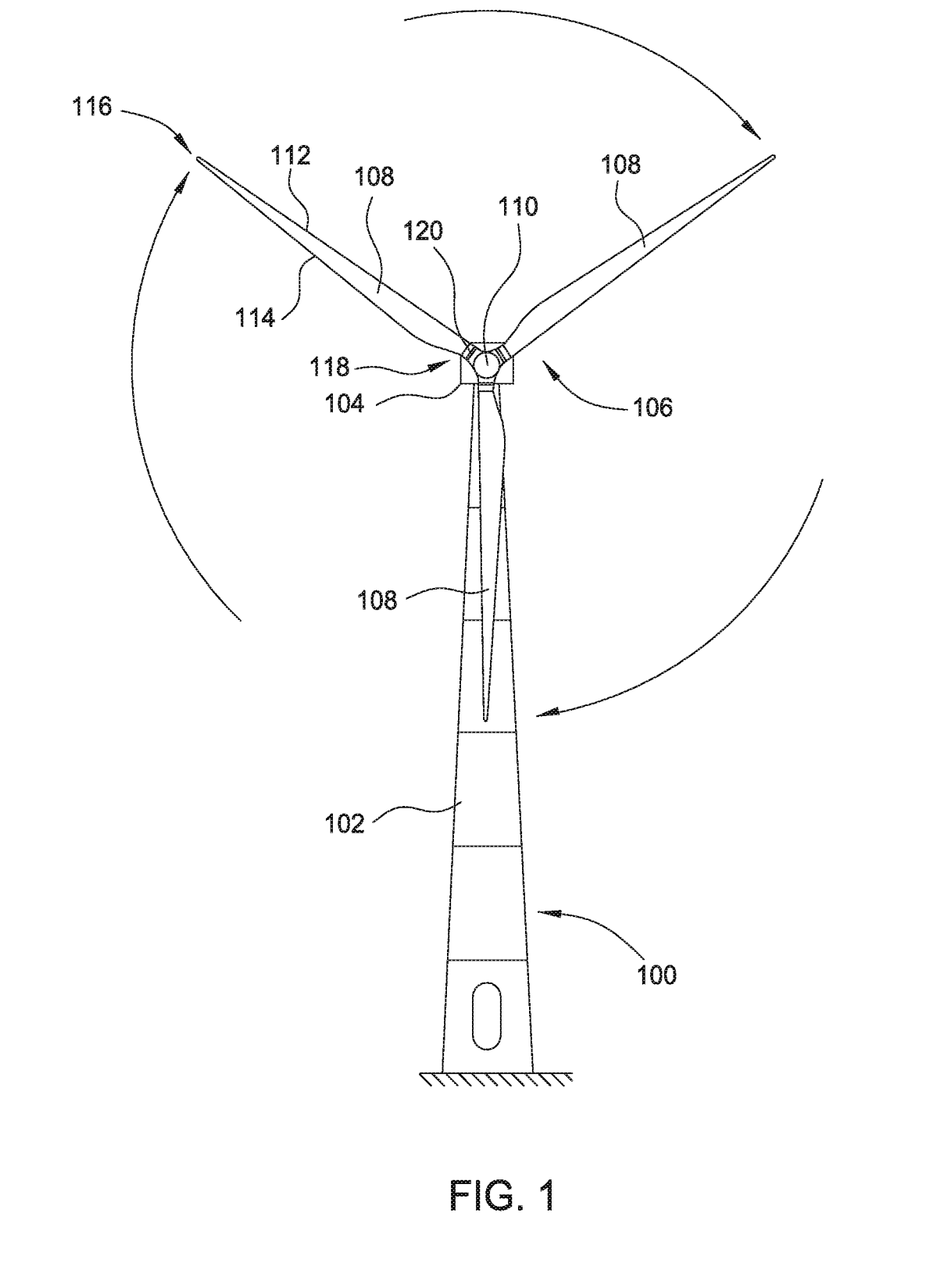
FIG. 1 illustrates a diagrammatic view of a horizontal-axis wind turbine, according to one embodiment.

FIG. 1 illustrates a diagrammatic view of a horizontal-axis wind turbine (also "wind turbine generator," or WTG) 100. The wind turbine 100 typically includes a tower 102 and a nacelle 104 located at the top of the tower 102. A wind turbine rotor 106 may be connected with the nacelle 104 through a low speed shaft extending out of the nacelle 104. As shown, the wind turbine rotor 106 includes three rotor blades 108 mounted on a common hub 110, but may include any suitable number of blades, such as two, four, five, or more blades. The blade 108 (or airfoil) typically has an aerodynamic shape with a leading edge 112 for facing into the wind, a trailing edge 114 at the opposite end of a chord for the blade 108, a tip 116, and a root 118 for attaching to the hub 110 in any suitable manner. For some embodiments, the blades 108 may be connected to the hub 110 using pitch bearings 120 such that each blade 108 may be rotated around its longitudinal axis to adjust the blade's pitch.

Figure 2:
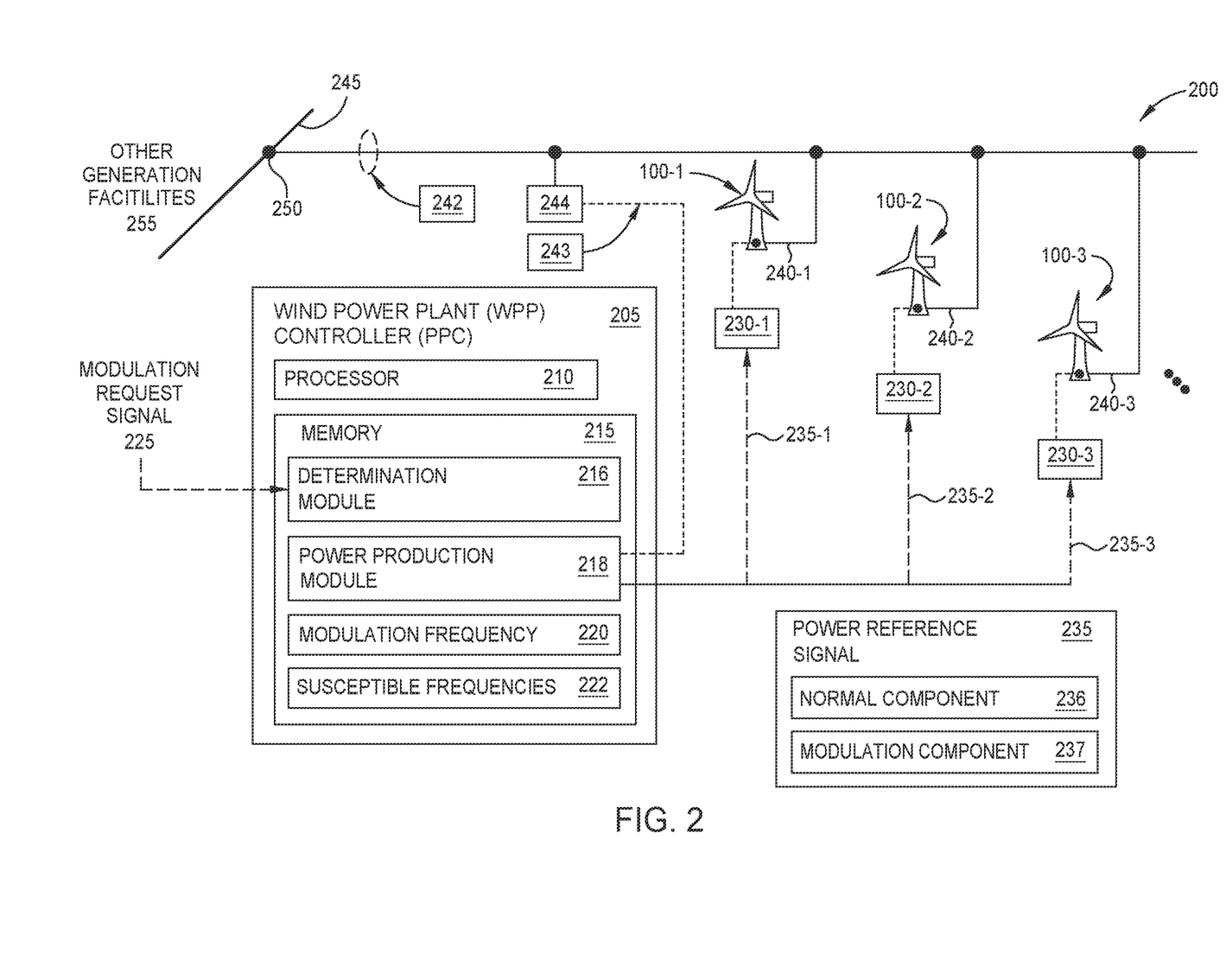
FIG. 2 illustrates a wind power plant operatively connected with an electrical grid, according to one embodiment.

FIG. 2 illustrates a wind power plant operatively connected with an electrical grid, according to one embodiment. In general, wind power plant (WPP) 200 may also be referred to as a wind farm or wind park. The WPP 200 includes a plurality of wind turbines (or WTGs) 100 (i.e., wind turbines 100-1, 100-2, 100-3, . . . ) operatively connected with an electrical grid 245 at a point of common coupling (PCC) 250. The electrical grid 245 represents any suitable electrical transmission and/or distribution grids, which may be operated at one or more voltages. The electrical grid 245 generally includes a number of transmission lines, transformers, substations, etc. The electrical grid 245 is connected with other generation facilities 255, such as one or more additional wind power plants and/or one or more non-wind power based generation facilities, such as fossil fuel-based, geothermal, solar, hydroelectric, nuclear, and so forth. The electrical grid 245 is also connected with one or more loads (not shown), which generally represent industrial, commercial, and/or residential electricity consumers.

Each WTG 100-1, 100-2, 100-3, . . . includes an electrical generator (not shown) configured to convert the mechanical energy of the wind turbine rotor into one or more phases of electrical power as respective power outputs 240-1, 240-2, 240-3, . . . that are ultimately delivered to the electrical grid 245 and to any loads connected therewith. Each WTG 100-1, 100-2, 100-3, . . . may include a power converter system configured to couple with the electrical generator and with the electrical grid 245, and further configured to convert alternating current (AC) power received from the electrical generator into AC power that is suitable for supplying to the electrical grid 245. The electrical generators may be of any suitable type, such as induction generators (IG), permanent magnet generators (PMG) with frequency-converters, doubly-fed induction generators, etc., as would be known to a person skilled in the art.

The operation of the wind power plant 200 is controlled using a WPP controller (or PPC) 205 communicatively coupled with one or more WTG controllers 230 (i.e., WTG controllers 230-1, 230-2, 230-3, . . . ) using any suitable communication means, whether wire-based, wireless, optical, etc. In some embodiments, each WTG 100 is controlled by a separate WTG controller 230. In various embodiments, the WTGs 100-1, 100-2, 100-3, . . . produce electrical power based on control signals provided by WPP controller 205 and/or WTG controllers 230. Although not shown, the WTG controllers 230 may provide feedback signals and/or other information to the WPP controller 205.

The plant power output 242 is controlled by the WPP controller 205 and represents a collective power delivered to the electrical grid 245 by the WPP 200. In one embodiment, the power output 242 is an aggregation of the various power outputs 240. In another embodiment, the power output 242 can further reflect, in addition to the WTG power outputs 240, effects from signal conditioning and/or the operation of other power sources or loads controlled by the WPP controller 205, such as energy storage devices 244.

The WPP controller 205 includes one or more processors 210 and memory 215. Although not shown, each of the WTG controllers 230 also includes one or more processors and memory. The processors 210 may have any suitable form, such as a general purpose microprocessor, a controller, an application-specific integrated circuit (ASIC), and so forth. Memory 215 may include a variety of computer-readable media selected for their size, relative performance, or other capabilities: volatile and/or non-volatile media, removable and/or non-removable media, etc.

Memory 215 may include one or more modules for performing various functions described herein. The modules generally include program code that is executable by one or more of the processors 210. As shown, the wind power plant controller 205 includes a determination module 216 and a power production module 218 (or "power production module," "power module").

The determination module 216 is configured to receive a modulation request signal 225 that indicates a requested modulation of the power output. In some embodiments, the modulation request signal 225 can be communicated to the wind power plant controller 205 by a transmission system operator (TSO) for the electrical grid 245. Generally, the requested modulation specifies one or more parameters, e.g., a waveform, a modulation frequency, a phase, and/or an amplitude of the additional power to be produced by the wind power plant 200. Any suitable periodic waveform may be specified, such as a sine wave, triangle wave, sawtooth wave, etc. The specified modulation frequency is generally significantly less than the nominal grid frequency. For example, electrical grids in Europe typically operate at 50 hertz (Hz) and electrical grids in America typically operate at 60 Hz. In some embodiments, the modulation frequency is between about 0.1 Hz and 10 Hz, though alternate embodiments may have larger or smaller ranges. The specified phase value helps ensure that the modulation power generated by the wind power plant 200 to fulfill the modulation request signal 225 is counter-phase to the power oscillations on the electrical grid. In some cases, if the phase of the modulation power is incorrect, the modulation power could constructively interfere with the power oscillations, and thereby worsen the oscillations on the electrical grid 245.

The modulation request signal 225 may specify the requested modulation in any suitable form, such as the desired waveform to be matched by the wind power plant 200, distinct values of frequency, phase, and/or amplitude, and so forth. In some embodiments, the determination module 216 is further configured to determine the amplitude, frequency, and/or phase of the request using signal processing techniques. The modulation frequency 220, whether specified directly or determined through processing by the determination module 216, may be stored in the memory 215.

In an alternative embodiment, the determination module 216 does not receive a modulation request signal 225, but instead determines a modulation to be included in the power output 242 based on sensor measurements or other data provided to the WPP controller 205.

In some embodiments, the determination module 216 is further configured to determine whether the modulation frequency 220 corresponds to one or more predetermined susceptible frequencies 222. At these susceptible frequencies 222, at least one of the WTGs 100 has a greater susceptibility to mechanical oscillations, which can cause accelerated wear or damage to components of the WTGs 100. In many cases, multiple or all of the WTGs 100 in the WPP 200 have similar implementations and thus similar susceptibility. One example of susceptible frequencies 222 includes 1P or 3P frequencies, which occur once or three times, respectively, during each rotation of the rotor of the wind turbine. The 1P and 3P can correspond to rotor imbalances and effects such as tower shadow effect (i.e., caused by the fluctuating wake behind the towers). Other examples of susceptible frequencies include eigenfrequencies (also called natural or resonant frequencies) of drivetrain components such as the shaft, gearbox, and rotor, frequencies giving rise to nacelle-tower oscillations, and so forth. For example, drivetrain eigenfrequencies can be in the range of about 2-3 Hz, and tower-nacelle mass resonances can be in the range of about 0.1-0.4 Hz.

The determination of whether the modulation frequency 220 corresponds to a particular susceptible frequency 222 can influence how the requested modulation is fulfilled by the WPP 200. In one example, when modulation frequency 220 is determined to correspond to a susceptible frequency 222 that affects certain ones (but not all) of the WTGs 100, the determination module 216 selects one or more of the other, non-susceptible WTGs 100 to fulfill the requested modulation. In another example, the determination module 216 selects two or more WTGs 100—at least one of which is susceptible at the particular susceptible frequency 222—to fulfill the requested modulation. Each of the two or more selected WTGs 100 fulfills a portion of the requested modulation at a frequency that differs from the modulation frequency 220. These frequencies are selected such that a combination of the produced modulation power by each of the WTGs 100 produces the requested modulation in the plant power output 242 while avoiding operating the WTGs 100 at the susceptible frequency 222. In some embodiments, the frequencies are selected to be suitably far from the particular susceptible frequency 222. Some non-limiting examples are less than or equal to half the modulation frequency 220, and greater than or equal to twice the modulation frequency 220. The frequencies may further be selected to avoid other ones of the susceptible frequencies 222.

In some embodiments, the modulation frequency 220 can be decomposed or demodulated into lower frequency components that, when combined, produce the requested modulation at the modulation frequency 220. In one embodiment (discussed further with respect to FIG. 4), each WTG 100 of N WTGs 100 selected to fulfill the requested modulation produce a modulated power at a frequency that is (1/N) times the modulation frequency 220. The produced modulated power outputs can be staggered (i.e., given different phase values) such that the additive effect of the modulated power outputs in the plant power output 242 corresponds to the requested modulation.

Additionally or alternatively to the lower frequency components, the modulation frequency 220 can be modulated into higher frequency components that, when combined, produce the requested modulation at the modulation frequency 220. This can be helpful in cases where the requested modulation is a periodic, non-sinusoidal waveform. In one embodiment (discussed further with respect to FIG. 5), certain WTGs 100 of the WPP 200 (such as susceptible WTGs) can produce modulated power at higher harmonics of the modulation frequency 220. The WPP 200 can control other (non-susceptible) WTGs 100 and/or energy storage devices 244 to provide a modulated power signal at the modulation frequency 220. The modulation frequency 220 components and higher harmonic components can be combined together, e.g., as in a Fourier series, to approximate the requested periodic, non-sinusoidal waveform.

In other cases when the modulation frequency 220 does not correspond to one of the susceptible frequencies 222, one or more selected WTGs 100 may produce a modulated power output at the modulation frequency 220. In one example, a single WTG 100 can be used to fulfill the requested modulation at the modulation frequency 220. In another example, multiple WTGs 100 may each produce modulated power at the modulation frequency 220 with a reduced amplitude, which when combined together produce the requested modulation of the plant power output 242 at the modulation frequency 220. Additionally or alternatively, even though the modulation frequency 220 does not correspond to one of the susceptible frequencies 222, the WPP controller 205 may continue to fulfill the requested modulation using higher and/or lower frequency components.

The power production module 218 is configured to generate power reference signals 235, set points, or other suitable demand signals for controlling the power produced by each of the WTGs 100 of the WPP 200. The power production module 218 is further configured to generate control signals 243 for controlling one or more energy storage devices 244 coupled with the plant power output 242.

The power reference signals 235 may each comprise a normal component 236 and a modulation component 237, which when combined instruct the corresponding WTG 100 to produce a modulated power output 240 that fulfills a portion of the requested modulation of the plant power output 242. In some embodiments, the power production module 218 generates the normal components 236 of the power reference signals 235 based on a received or generated WPP-level power demand signal, such as a WPP power output set point, according to any suitable techniques. The power production module 218 generates the modulation components 237 based on the modulation request signal 225. Thus, each of the modulation components 237 for various WTGs 100 represents a portion of the requested modulation.

The WTG controllers 230 may fulfill the modulation components 237 in any suitable manner. For example, the WTG controllers 230 may oscillate the pitch of the rotor blades to introduce the low-frequency modulation into the power outputs 240. In some embodiments, depending on the amplitude of the modulation components 237, the WTG controllers 230 may allow the WTGs 100 to be temporarily overloaded so that energy production is not needlessly limited by the modulation operation. Of course, this presumes that the WTG 100 is operating under conditions where additional energy can be drawn from the wind, e.g., by changing the rotational speed and/or changing the pitch angle.

While various embodiments have been discussed in which the modulation request signal 225 is provided to the WPP controller 205 that in turn controls the WTG controllers 230, in alternate embodiments the WTG controllers 230 may perform some or all of the functionality of the WPP controller 205. For example, the WTG controllers 230 may receive the modulation request signal 225 and apportion the requested modulation using communication between WTG controllers 230 and/or performing predetermined operations.

Figure 3:
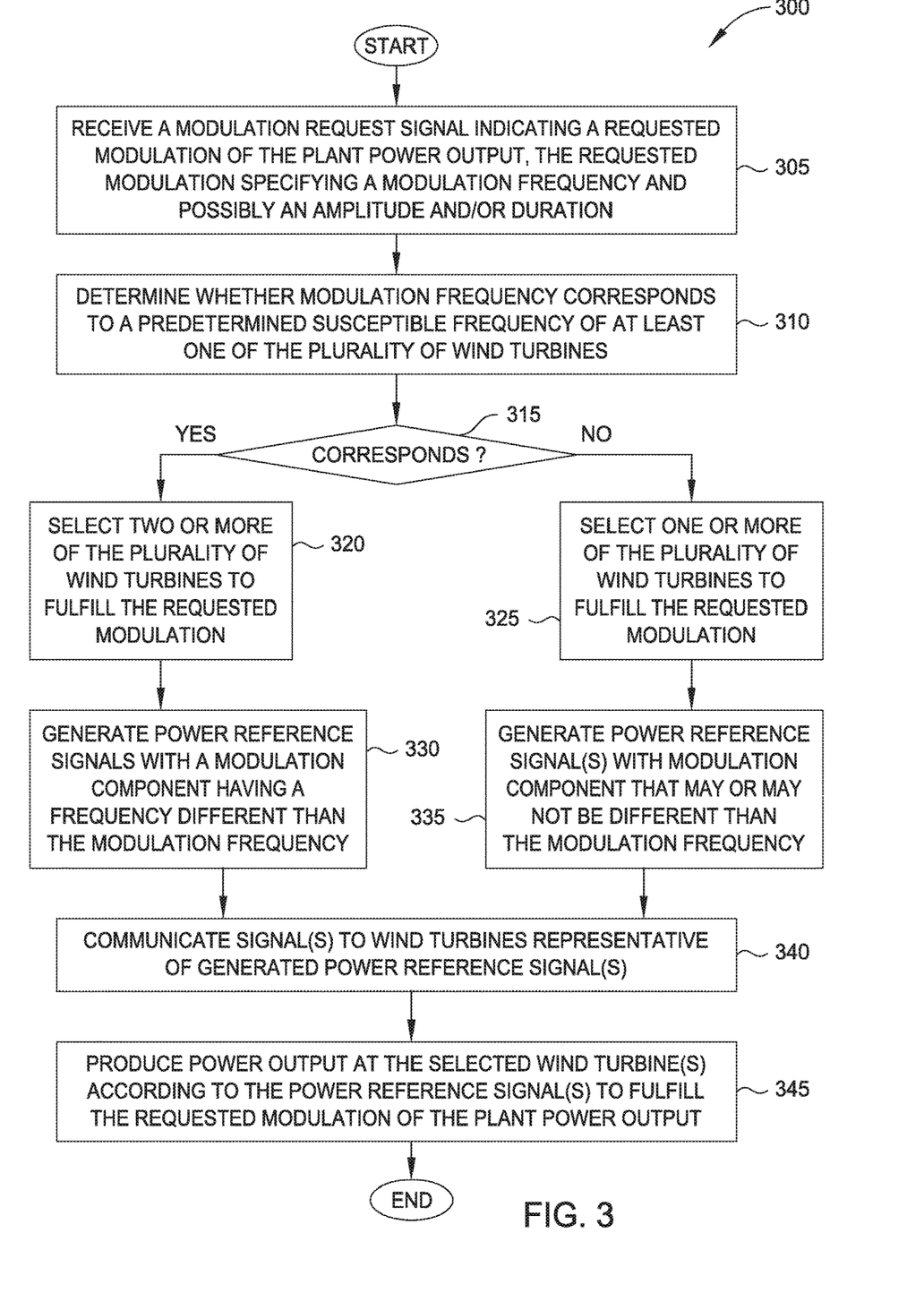
FIG. 3 illustrates a method of operating a wind power plant, according to one embodiment.

FIG. 3 illustrates a method of operating a wind power plant, according to one embodiment. Generally, method 300 may be performed by a WPP controller 205 in a WPP 200 discussed above. Method 300 begins at block 305, where the WPP controller receives a modulation request signal indicating a requested modulation of the plant power output. The requested modulation specifies a modulation frequency, and may further specify a phase, amplitude, and/or duration. The modulation request signal may have any suitable form, such as the desired waveform and/or values describing the waveform, such as frequency, phase, and/or amplitude values, and so forth. In some cases, the WPP controller may perform processing (e.g., spectral analysis) on the received modulation request signal to derive the modulation frequency.

At block 310, the WPP controller determines whether the modulation frequency corresponds with a predetermined susceptible frequency of at least one of the plurality of WTGs. At a susceptible frequency, the WTG has a relatively greater susceptibility to mechanical oscillations, which can cause accelerated wear or damage to components of the WTG. Some examples of susceptible frequencies may include 1P or 3P frequencies, eigenfrequencies of drivetrain components, frequencies giving rise to nacelle-tower oscillations, and so forth. If the modulation frequency does not correspond to a susceptible frequency (block 315: NO) the WPP controller selects one or more WTGs to fulfill the requested modulation (block 325) and generates power reference signals for the selected one or more WTGs that include a modulation component having a frequency that can be the same as the modulation frequency (block 335). The method proceeds to block 340, where the WPP controller communicates signal(s) to the WTGs that are representative of the generated power reference signal(s). In some cases, the communicated signal is the generated time-varying power reference signal. In other cases, the communicated signal includes information that is representative of the time-varying power reference signal. For example, the communicated signal could be an overlay signal that includes values of amplitude, frequency, phase, and/or duration. In these cases, the WTG controller may perform calculations using the communicated signal to produce the desired time-varying power reference signals to the WTG controller's closed-loop control algorithm. The method proceeds to block 345, where the WPP controller produces a power output at the selected WTGs according to the power reference signals to fulfill the requested modulation of the power plant output.

However, if the modulation frequency does correspond to at least one susceptible frequency (block 315: YES), the WPP controller selects two or more WTGs to fulfill the requested modulation at block 320. The selected two or more WTGs may include at least one "susceptible" WTG that has a susceptible frequency at the modulation frequency. At block 330, the WPP controller generates power reference signals for the selected two or more WTGs having a modulation component with a frequency (or frequencies) different from that of the modulation frequency. The frequency may be greater than or less than the modulation frequency, so long as the plant power output collectively reflects the requested modulation after performing blocks 340 and 345. Method 300 ends following completion of block 345.

Figure 4:
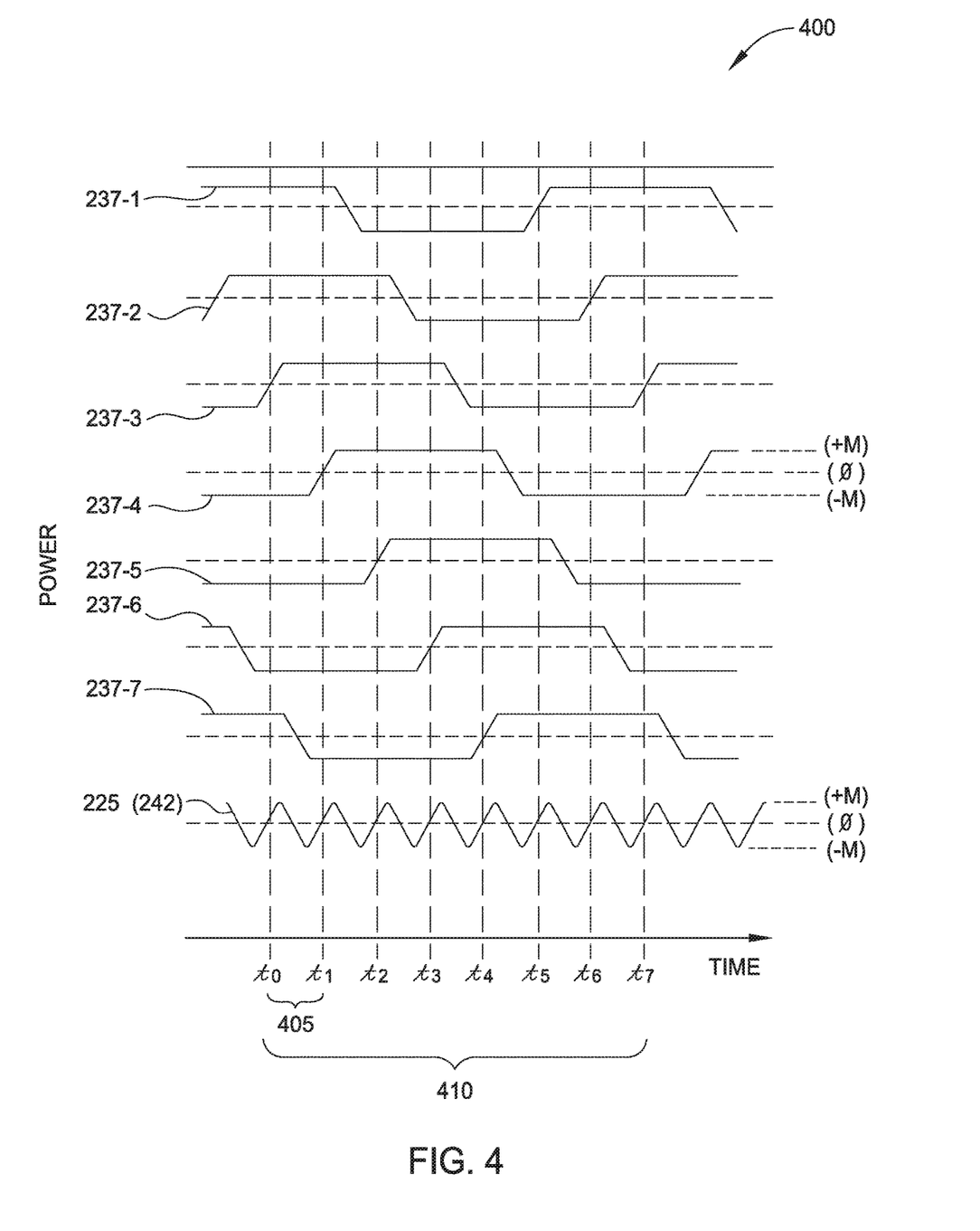
FIG. 4 includes a graph illustrating modulation frequency components of power reference signals, according to one embodiment.

FIG. 4 includes a graph illustrating modulation frequency components of power reference signals, according to one embodiment. Generally, the graph 400 may reflect the operation of the WPP controller 205 within WPP 200.

The modulation request signal 225 is depicted as a periodic triangle waveform with amplitude M (i.e., oscillating between +M and −M values), although other waveforms are possible. The modulation request signal 225 also indicates a phase and a modulation frequency corresponding to period 405 (between times $t_0$ and $t_1$). After receiving the modulation request signal 225, the WPP controller may select a plurality of WTGs to fulfill the requested modulation, generating a plurality of power reference signals to control the operation of the selected WTGs.

In some cases, the WPP controller adjusts the power reference signals to include a modulation component 237 having a frequency different from that of the modulation frequency. The modulation component 237 may be added onto a "normal" component of the power reference signal corresponding to the current power production of the WTG. As shown, WPP controller produces seven modulation components 237-1, 237-2, . . . , 237-7 that may correspond to seven WTGs of the WPP. Alternately, different numbers of WTGs can be selected to fulfill the requested modulation, and/or one or more of the modulation components could be fulfilled by other energy sources controlled by the WPP controller (such as an energy storage device).

Each of the modulation components 237 has a frequency corresponding to period 410 (between times $t_0$ and $t_7$). As shown, the period 410 is seven times longer than period 405, so the frequency of the modulation components 237 is one-seventh ($\frac{1}{7}$) the modulation frequency. Of course, the frequency may differ depending on the number of selected WTGs. In this simplified example, each modulation component 237 is shown as having the same amplitude M as the modulation request signal, but other implementations may have differing amplitudes.

When summed together, e.g., as part of a collective plant power output 242, the modulation components 237 substantially form the modulation request signal 225. For example, at time $t_1$ the value of the modulation request signal is zero. The modulation components 237-1, 237-2, 237-3 each have a +M value (+3M in total), the modulation components 237-5, 237-6, 237-7 each have a −M value (−3M in total), and modulation component 237-4 has a zero value. Therefore, the sum of the modulation components 237 equals the value of the modulation request signal 225 at time $t_1$, as well as throughout graph 400.

Figure 5:
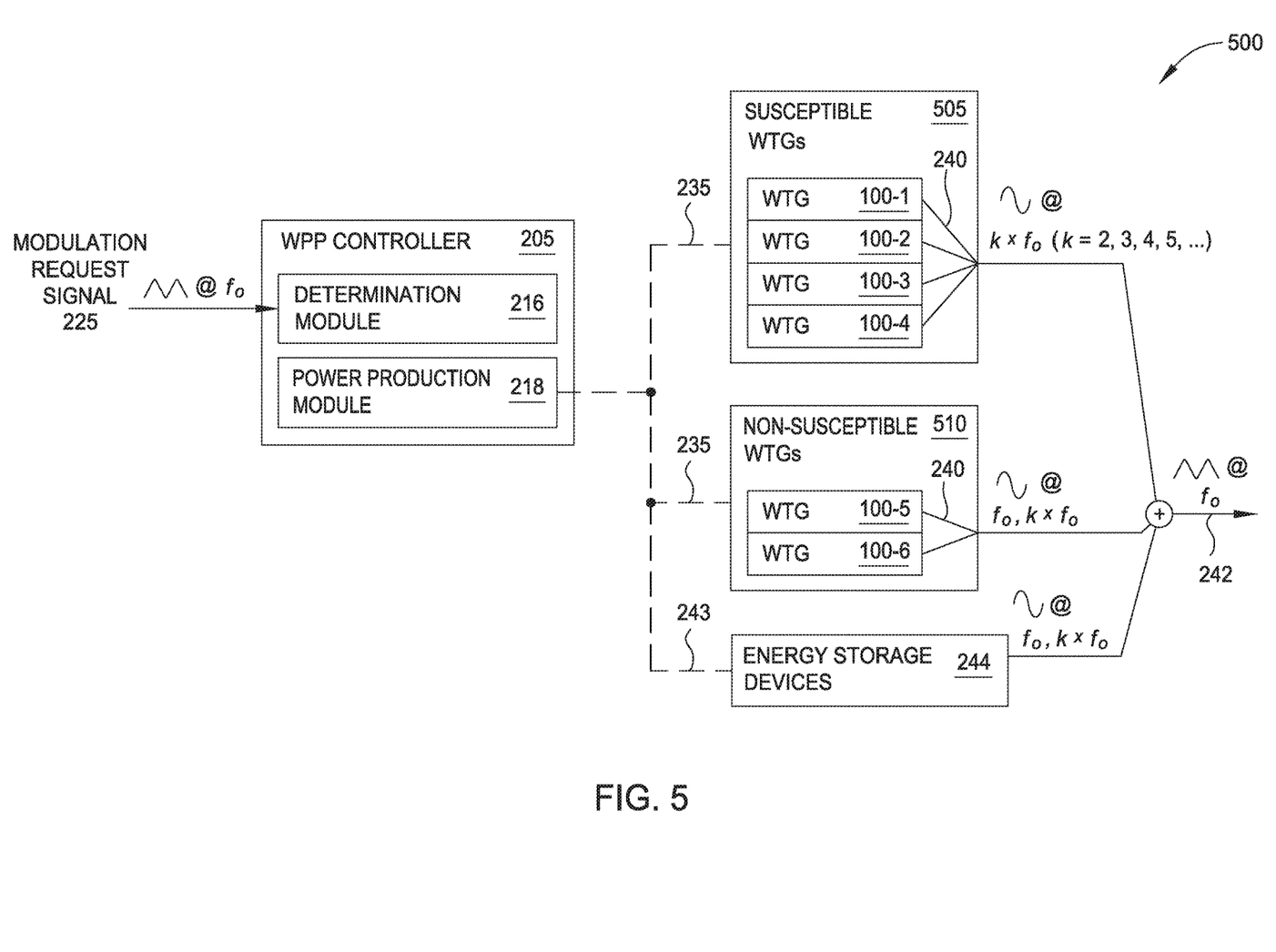
FIG. 5 illustrates an exemplary apportioning of a requested modulation, according to one embodiment.

FIG. 5 illustrates an exemplary apportioning of a requested modulation, according to one embodiment. Six WTGs 100-1, 100-2, . . . , 100-6 are depicted, but this number may vary based on the size of the WPP, which WTGs are operationally available to fulfill a portion of the requested modulation, and so forth. In arrangement 500, a modulation request signal 225 is received by the WPP controller 205. As shown, the modulation request signal 225 is a triangular waveform having a modulation frequency $f_0$. The determination module 216 determines whether modulation frequency $f_0$ corresponds to any susceptible frequencies of the WTGs, and based on the determination may group the WTGs as susceptible WTGs 505 and non-susceptible WTGs 510. Generally, the WPP controller will not cause the susceptible WTGs 505 to operate at the susceptible frequency to meet their respective portions of the requested modulation, but may increase or decrease the frequency as appropriate.

Depending on the amplitude of the requested modulation, one or more of the non-susceptible WTGs 510 and/or the energy storage devices 244 may be used to provide a modulation component at the modulation frequency $f_0$. In some embodiments, the modulated output provided by the non-susceptible WTGs 510 and/or the output of the energy storage devices 244 may be sufficient to fulfill the requested modulation (i.e., the triangular waveform) in the plant power output 242.

However, in another embodiment, the combined power outputs 240 of the susceptible WTGs 505 and non-susceptible WTGs 510 and/or the output of the energy storage devices 244 may be combined to produce the requested waveform. For example, the various outputs may be combined as in a Fourier series to approximate any periodic, non-sinusoidal waveform. As shown, the non-susceptible WTGs 510 and/or the energy storage devices 244 produce sinusoids of frequency $f_0$, and the susceptible WTGs 505 produce sinusoids at higher harmonics ($k \times f_0$), where k=2, 3, 4, 5, . . . . When added together, the sinusoids at the different frequencies approximate the requested triangular waveform within the power output 242.

In the various embodiments, the WTGs are simplistically depicted as having a single frequency within the modulation component. However, it will be noted that the WTGs need not be limited to contributing to the modulation of the plant power output at a single frequency, but may have modulation components that include multiple frequency components.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects may take the form of a computer program product embodied in one or more computer readable medium(s) having computer readable program code embodied thereon. Program code embodied on a computer readable medium may be transmitted using any appropriate medium, including but not limited to wireless, wireline, optical fiber cable, RF, etc., or any suitable combination of the foregoing.

Aspects of the present disclosure are described above with reference to flowchart illustrations and/or block diagrams of methods, apparatus (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

The invention claimed is:

1. A method of operating a wind power plant comprising a plurality of wind turbines, the wind power plant producing a plant power output, the method comprising:
receiving a modulation request signal indicating a requested modulation of the plant power output, wherein the requested modulation specifies a plant modulation frequency and is counter-phase to a power oscillation on an electrical grid; and
in response to determining that the plant modulation frequency is equal to a susceptible frequency at which a first wind turbine of the plurality of wind turbines has a greater susceptibility to mechanical oscillations, generating a respective power reference signal for each of at least two wind turbines of the plurality of wind turbines selected to fulfill the requested modulation,
wherein the at least two wind turbines comprises the first wind turbine,
wherein each generated power reference signal includes a respective modulation component corresponding to a portion of the requested modulation and having a respective modulation frequency different than the plant modulation frequency, and
wherein a waveform of the requested modulation is an arithmetic sum of the respective modulation components.

2. The method of claim 1, wherein the respective modulation frequency of the respective modulation component of one of the generated power reference signals is less than or equal to half the plant modulation frequency.

3. The method of claim 1, wherein the respective modulation frequency of each modulation component is a same frequency, and wherein the power reference signals are generated to have different phase values.

4. The method of claim 3, wherein the respective modulation frequency is (1/N) times the plant modulation frequency, wherein N represents a number of the at least two wind turbines selected to fulfill the requested modulation.

5. The method of claim 1, wherein the plant modulation frequency is between 0.1 hertz (Hz) and 10 Hz.

6. The method of claim 1, wherein generating the power reference signals results in a temporary overloading of the at least two wind turbines.

7. A controller for a wind power plant comprising a plurality of wind turbines and producing a plant power output, the controller comprising:
one or more processors configured to:
receive a modulation request signal indicating a requested modulation of the plant power output, wherein the requested modulation specifies a plant modulation frequency and is counter-phase to a power oscillation on an electrical grid;
select at least two wind turbines of the plurality of wind turbines to fulfill the requested modulation; and
in response to determining that the plant modulation frequency is equal to a susceptible frequency at which a first wind turbine of the at least two wind turbines has a greater susceptibility to mechanical oscillations, generate a respective power reference signal for each of the selected at least two wind turbines,
wherein each generated power reference signal includes a respective modulation component corresponding to a portion of the requested modulation and having a respective modulation frequency different than the plant modulation frequency, and
wherein a waveform of the requested modulation is an arithmetic sum of the respective modulation components.

8. The controller of claim 7, wherein the respective modulation frequency of the respective modulation component of one of the generated power reference signals is less than or equal to half the plant modulation frequency.

9. The controller of claim 7, wherein the respective modulation frequency of each modulation component is a same frequency, and wherein the power reference signals are generated to have different phase values.

10. The controller of claim 9, wherein the respective modulation frequency is (1/N) times the plant modulation frequency, wherein N represents a number of the at least two wind turbines selected to fulfill the requested modulation.

11. The controller of claim 7, wherein the plant modulation frequency is between 0.1 hertz (Hz) and 10 Hz.

12. The controller of claim 7, wherein generating the power reference signals results in a temporary overloading of the at least two wind turbines.

13. A computer program product comprising a non-transitory computer-readable device having computer-readable program code embodied therewith, the computer-readable program code configured to perform an operation for controlling a wind power plant comprising a plurality of wind turbines and producing a plant power output, the operation comprising:
receiving a modulation request signal indicating a requested modulation of the plant power output, wherein the requested modulation specifies a plant modulation frequency and is counter-phase to a power oscillation on an electrical grid; and
in response to determining that the plant modulation frequency is equal to a susceptible frequency at which a first wind turbine of the plurality of wind turbines has a greater susceptibility to mechanical oscillations, generating a respective power reference signal for each of at least two wind turbines of the plurality of wind turbines selected to fulfill the requested modulation,
wherein the at least two wind turbines comprises the first wind turbine,
wherein each generated power reference signal includes a respective modulation component corresponding to a portion of the requested modulation and having a respective modulation frequency different than the plant modulation frequency, and
wherein a waveform of the requested modulation is an arithmetic sum of the respective modulation components.

14. The computer program product of claim 13, wherein the respective modulation frequency of the respective modulation component of one of the generated power reference signals is less than or equal to half the plant modulation frequency.

15. The computer program product of claim 13, wherein the respective modulation frequency of each modulation component is a same frequency, and wherein the power reference signals are generated to have different phase values.

16. The computer program product of claim 15, wherein the respective modulation frequency is (1/N) times the plant modulation frequency, wherein N represents a number of the at least two wind turbines selected to fulfill the requested modulation.

17. The computer program product of claim 13, wherein generating the power reference signals results in a temporary overloading of the at least two wind turbines.

\* \* \* \* \*